United States Patent
Kim et al.

(10) Patent No.: US 12,046,379 B2
(45) Date of Patent: Jul. 23, 2024

(54) NUCLEAR REACTOR WITH AN AXIALLY STRATIFIED FUEL BED

(71) Applicant: X-Energy, LLC, Rockville, MD (US)

(72) Inventors: Howard Kim, Knoxville, TN (US); Daniel Brown, Knoxville, TN (US)

(73) Assignee: X-ENERGY, LLC, Rockville, MD (US)

( * ) Notice: Subject to any disclaimer, the term of this patent is extended or adjusted under 35 U.S.C. 154(b) by 0 days.

(21) Appl. No.: 17/811,400

(22) Filed: Jul. 8, 2022

(65) Prior Publication Data
US 2024/0013936 A1    Jan. 11, 2024

(51) Int. Cl.
G21C 5/18    (2006.01)
G21C 3/62    (2006.01)

(52) U.S. Cl.
CPC ............ *G21C 5/18* (2013.01); *G21C 3/626* (2013.01)

(58) Field of Classification Search
CPC . G21C 3/626; G21C 3/04; G21C 3/07; G21C 1/07; G21C 5/18; G21C 19/202; G21C 1/06; G21C 1/10; G21C 1/12; G21C 5/12; G21C 5/126; G21C 5/22; G21C 15/253; G21C 15/28; G21C 1/04; G21D 5/02
USPC ......................................................... 376/435
See application file for complete search history.

(56) References Cited

U.S. PATENT DOCUMENTS

| | | | | |
|---|---|---|---|---|
| 2,809,931 A | * | 10/1957 | Daniels | G21C 1/322 376/310 |
| 3,039,945 A | * | 6/1962 | Slack | G21C 1/07 376/904 |
| 3,325,363 A | * | 6/1967 | Goeddel | G21C 7/04 976/DIG. 97 |

(Continued)

FOREIGN PATENT DOCUMENTS

CN    111584100    *   8/2020    ............... G21C 3/62

OTHER PUBLICATIONS

Tapan Dash, Preparation and Neutronic Studies of Tungsten Carbide, Fusion Science & Technology (Year: 2014).*

(Continued)

*Primary Examiner* — Sharon M Davis
(74) *Attorney, Agent, or Firm* — Kramer & Amado, P.C.

(57) ABSTRACT

A nuclear reactor has an axially stratified fuel bed. The reactor features a reactor shell having a base, a top having an exhaust outlet, and an axis. The axially stratified fuel bed is within the reactor shell, and includes:
a first zone configured to operate at a first temperature T1, the first zone comprising a plurality of first fuel particles, each first fuel particle comprising a first radioactive ceramic core and a first ceramic seal coating; and
a second zone configured to operate at a second temperature T2, where T2>T1, the second zone comprising a plurality of second fuel particles, each second fuel particle comprising a second radioactive ceramic core and a second ceramic seal coating. A coolant fluid flow path carries a coolant fluid from the base of the reactor to the exhaust outlet, along a flow path passing sequentially through the first zone and the second zone. The first ceramic seal coating has greater stability at T1 than (Continued)

at T2, and the second ceramic seal coating has greater stability at T2 than the first ceramic seal coating.

23 Claims, 4 Drawing Sheets

(56) References Cited

U.S. PATENT DOCUMENTS

| | | | | |
|---|---|---|---|---|
| 3,799,790 | A * | 3/1974 | Schulz | C23C 16/26 |
| | | | | 427/249.1 |
| 4,113,563 | A * | 9/1978 | Tobin | G21C 1/12 |
| | | | | 376/427 |
| 5,317,611 | A | 5/1994 | Petrosky | |
| 10,643,754 | B2 | 5/2020 | Venneri | |
| 2011/0091004 | A1 | 4/2011 | Farmer | |

OTHER PUBLICATIONS

Sayed Mustafa, Investigation of the safety features of advanced PWR assembly using SiC, Zr, FeCrAl, and SS-310 as cladding materials, Scientific Reports 11, 17402 (Year: 2021).*

Cort, G. E., J. C. Vigil, and R. J. Jiacoletti. Predicted nuclear heating and temperatures in gas-cooled nuclear reactors for process heat applications. No. LA-6113-MS. Los Alamos National Lab.(LANL), Los Alamos, NM (United States), 1975. (Year: 1975).*

Shenoy, A. S., and D. W. McEachern. HTGR core thermal design methods and analysis. No. GA-A-12985; GA-LTR-17. General Atomics, San Diego, CA (United States), 1974. (Year: 1974).*

Huning, Alexander, Sriram Chandrasekaran, and Srinivas Garimella. "Whole-core transient analysis methodology for prismatic high temperature gas reactors." Nuclear Engineering and Design 368 (2020): 110788. (Year: 2020).*

Brian Boer, "Optimized Core Deisng and Fuel Management of a Pebble-Bed Type Nuclear Reactor", Jan. 20, 2009.

Liangxing Li et al., "Pressure Drop in Packed Beds with Horizontally or Vertically Stratified Structure", Nuclear Engineering and Technology, vol. 52, pp. 2491-2498, May 6, 2020.

I. Lindholm et al., "Dryout Heat Flux Experiments with Deep Heterogeneous Particle Bed", Nuclear Engineering and Design, vol. 236, pp. 2060-2074, Mar. 20, 2006.

Douglas Burns et al., "Nuclear Thermal Propulsion Reactor Materials", IntechOpen, www.intechopen.com/books/nuclear-materials/nuclear-thermal-propulsion-reactor-materials, Mar. 10, 2020.

C.M. Hollabaugh et al., "A New Method for Coating Microspheres with Zirconium Carbide and Zirconium Carbide-Carbon Graded Coats", Journal of Nuclear Materials, vol. 57, pp. 325-332, Feb. 26, 1975.

Brian C. Jolly, et al., "Coating Development on Graphite-Based Composite Fuel for Nuclear Thermal Propulsion", Propulsion and Energy Forum, 51st AIAA/SAE/ASEE Joint Propulsion Conference, Orlando, Florida, Jul. 27-29, 2015.

Seung Hyun Nam, et al., "Innovative Concept for an Ultra-Small Nuclear Thermal Rocket Utilizing a New Moderated Reactor", Nuclear Engineering Technology, vol. 47, pp. 678-699, Aug. 11, 2015.

Sumer Sahin, et al., "Criticality and Burn Up Evolutions of the Fixed Bed Nuclear Reactor with Alternative Fuels", Energy Conversion and Management, vol. 51, pp. 1781-1787, Mar. 11, 2010.

* cited by examiner

NUCLEAR REACTOR WITH AN AXIALLY STRATIFIED FUEL BED

TECHNICAL FIELD

Various exemplary embodiments disclosed herein relate generally to a nuclear reactor with an axially stratified fuel bed, suitable for high temperature aerospace applications. The axially stratified fuel bed offers a graded approach for pebbles or compacts with different TRISO layers which impact fuel properties such as temperature resistance and irradiation reactivity.

BACKGROUND

Conventional high temperature gas cooled nuclear reactors (HTGR) utilizing spherical or cylindrical TRISO based fuel elements are filled with a homogenous bed of fuel elements during operation.

HTGR reactors operate at temperatures of approximately 900° C. and utilize nuclear fuel elements containing particulate nuclear fuels. The particulate nuclear fuels are surrounded with a matrix material which is molded and pressed into nuclear fuel elements with a variety of shapes and geometries such as spheres, e.g., pebbles, and cylinders, e.g., compacts. The nuclear fuel elements are then stacked as a bed of pebbles or compacts, and inert gas is flowed through the bed. The fuel elements heat up the inert gas. The hot gas can be used for multiple applications, such as power generation.

The particulate nuclear fuels in HTGR reactors may include a radioactive ceramic core, e.g., a uranium oxide, a thorium oxide, or a plutonium oxide. In various embodiments, a radioactive ceramic core is covered with a ceramic seal coat, such as a carbide or nitride of silicon, zirconium, or tungsten. The radioactive ceramic core is covered with multiple coatings. For example, the particulate nuclear fuels may be Tristructural Isotropic particle (TRISO) particles. The TRISO nuclear fuel particles utilize successive laminar layers of carbon and a ceramic seal coat. TRISO nuclear fuel particles include a uranium based nuclear fuel particle core, e.g., $UO_3$ or $U_3O_8$, which is initially coated with a porous low density carbon layer, i.e., a buffer carbon layer, an inner dense pyrolytic carbon (IPyC), a ceramic seal coat, e.g., silicon carbide, and an outer dense pyrolytic carbon (OPyC). These layers are deposited on the core with a fluidized bed chemical vapor deposition technique.

Silicon-based ceramics are frequently used as seal coatings on nuclear fuel particles, e.g., TRISO type particles. However, in certain applications, nuclear reactors are required to operate at extreme temperatures, i.e., temperatures exceeding 2000° C. Such reactors may, for example, be used for nuclear thermal propulsion (NTP) technology. Silicon-based ceramic seal coatings are not ideal for high-temperature applications, i.e., temperatures exceeding 1500° C. A variety of carbide, boride, nitride, and/or oxide ceramics are stable at temperatures exceeding 2000° C. However, many of these high temperature ceramics are costly to produce, rendering their use as seal coatings on all nuclear fuel particles within a fuel bed economically unfeasible. Further, some of the ceramic materials, e.g., tungsten carbide, are highly stable at extreme temperatures, but do not have the appropriate neutron cross section to sustain criticality. Thus, for example, a bed consisting of nuclear fuel particles with a tungsten carbide seal coating may be resistant to degradation at extreme temperatures, but may not be able to sustain a nuclear reaction.

There is a need in the art for economically viable nuclear reactors with fuel particles which can maintain criticality, while also withstanding extreme temperatures.

SUMMARY

In light of the present need for high temperature nuclear reactors, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments disclosed herein relate to a nuclear reactor with an axially stratified fuel bed, including a reactor shell having a base, a top having an exhaust outlet, and an axis. The axially stratified fuel bed includes multiple zones, with:
  a first zone configured to operate at a first temperature T1, the first zone comprising a plurality of first fuel particles, each first fuel particle having a first radioactive ceramic core and a first ceramic seal coating; and
  a second zone configured to operate at a second temperature T2, where T2>T1, the second zone comprising a plurality of second fuel particles, each second fuel particle comprising a second radioactive ceramic core and a second ceramic seal coating;
  where the first ceramic seal coating has greater stability at T1 than at T2, and the second ceramic seal coating has greater stability at T2 than the first ceramic seal coating.

In various embodiments, the reactor includes a coolant fluid flow path configured to carry a coolant fluid from the base of the reactor to the exhaust outlet, wherein the coolant fluid flow path sequentially passes through the first zone and the second zone. The coolant fluid may be an inert gas, nitrogen, argon, helium, hydrogen, water, ammonia, oxygen, or carbon dioxide. In the case of nuclear thermal propulsion (NTP) reactors for aerospace applications, the coolant fluid may flow through the reactor at high velocity, both serving as a propellant and carrying heat away from the reactor.

According to various embodiments, the first fuel particles include a first ceramic seal coating with a first neutron absorption cross section; and the second fuel particles include a second ceramic seal coating with a second neutron absorption cross section, where the second neutron absorption cross section is higher than the first neutron absorption cross section.

According to various embodiments, the first fuel particles include a first radioactive ceramic core, and the second fuel particles include a second radioactive ceramic core with a second neutron absorption cross section, where the first radioactive ceramic core and the second radioactive ceramic core are each an oxide, carbide, oxycarbide, or nitride of uranium, thorium, or plutonium. The first radioactive ceramic core may be an oxide, carbide, oxycarbide, or nitride of uranium, thorium, or plutonium; and the second radioactive ceramic core may be a uranium oxide.

In various embodiments, the first fuel particles include a first ceramic seal coating of an oxide, carbide, boride, oxycarbide, or nitride of silicon; and the second fuel particles include a second ceramic seal coating of a high temperature ceramic-based seal coat selected from the group consisting of $HfB_2$, $ZrB_2$, $TiB_2$, $TaB_2$, $MoB$, $ZrC$, $HfC$, $TiC$, $TaC$, $MoC$, $Mo_2C$, $WC$, $HfN$, $ZrN$, $TiN$, $SiBCN$, and $Ta_4HfC_5$.

In various embodiments, the first fuel particles include a first ceramic seal coating which is an oxide, carbide, oxycarbide, or nitride of silicon or zirconium; and the second fuel particles include a second ceramic seal coating which is an oxide, carbide, oxycarbide, or nitride of zirconium or tungsten, where the first ceramic seal coating and the second ceramic seal coating do not both contain zirconium.

The first ceramic seal coating may be silicon carbide for use in a first zone configured to operate at a first temperature T1; and the second ceramic seal coating may be zirconium carbide for use in a second zone configured to operate at a second temperature T2, where T1 is between 750° C. and 1200° C., and T2 is between 1200° C. and 2000° C.

The first ceramic seal coating may be silicon carbide for use in a first zone configured to operate at a first temperature T1; and the second ceramic seal coating may be tungsten carbide for use in a second zone configured to operate at a second temperature T2, where T1 is between 750° C. and 1600° C., and T2 is between 1600° C. and 2800° C.

The first ceramic seal coating may be zirconium carbide for use in a first zone configured to operate at a first temperature T1; and the second ceramic seal coating may be tungsten carbide for use in a second zone configured to operate at a second temperature T2, where T1 is between 750° C. and 2000° C., and T2 is between 2000° C. and 2800° C.

Various embodiments disclosed herein relate to a nuclear reactor with an axially stratified fuel bed including multiple zones. The axially stratified fuel bed includes:
a first zone configured to operate at a first temperature T1, the first zone comprising a plurality of first fuel particles, each first fuel particle having a first radioactive ceramic core and a first ceramic seal coating;
a second zone configured to operate at a second temperature T2, where T2>T1, the second zone comprising a plurality of second fuel particles, each second fuel particle comprising a second radioactive ceramic core and a second ceramic seal coating; and
a third zone configured to operate at a third temperature T3, where T3>T2, the third zone comprising a plurality of third fuel particles, each third fuel particle comprising a third radioactive ceramic core and a third ceramic seal coating;
where the first ceramic seal coating has greater stability at T1 than at T2, the second ceramic seal coating has greater stability at T2 than at T3, and the third ceramic seal coating has greater stability at T3 than the second ceramic seal coating. The first ceramic seal coating may have a first neutron absorption cross section, and the third ceramic seal coating may have a third neutron absorption cross section, where the third neutron absorption cross section is higher than the first neutron absorption cross section.

In various embodiments, the axially stratified fuel bed includes:
a plurality of first fuel particles, where the first fuel particles have:
a first ceramic seal coating of an oxide, carbide, oxycarbide, or nitride of silicon;
a porous carbon layer, a pyrolytic carbon layer, or a combination thereof; or
an optional porous carbon layer, an optional inner pyrolytic carbon layer, the first ceramic seal coating, and an outer pyrolytic carbon layer;

a plurality of second fuel particles with a second ceramic seal coating of a first high temperature ceramic-based seal coat of $HfB_2$, $ZrB_2$, $TiB_2$, $TaB_2$, $ZrC$, $HfC$, $TiC$, $TaC$, $HfN$, $ZrN$, $TiN$, $SiBCN$, or $Ta_4HfC_5$; and a plurality of third fuel particles with a third ceramic seal coating of a second high temperature ceramic-based seal coat selected from the group consisting of $HfB_2$, $ZrB_2$, $TiB_2$, $TaB_2$, $HfC$, $TiC$, $TaC$, $WC$, $HfN$, $ZrN$, $TiN$, or $Ta_4HfC_5$;

wherein the second ceramic seal coating and the third ceramic seal coating are different. The second fuel particles may contain an outer pyrolytic carbon layer over the second ceramic seal coating. The third fuel particles may contain an outer pyrolytic carbon layer over the third ceramic seal coating.

In various embodiments, the axially stratified fuel bed includes:
a plurality of first fuel particles with a first ceramic seal coating of an oxide, carbide, oxycarbide, or nitride of silicon;
a plurality of second fuel particles with a second ceramic seal coating of a first high temperature ceramic-based seal coat of $HfB_2$, $ZrB_2$, $TiB_2$, $TaB_2$, $ZrC$, $HfC$, $TiC$, $HfN$, $ZrN$, $TiN$, or $SiBCN$; and
a plurality of third fuel particles with a third ceramic seal coating of a second high temperature ceramic-based seal coat selected from the group consisting of $WC$, $TaC$, $HfC$, or $Ta_4HfC_5$.

In various embodiments, the axially stratified fuel bed includes:
a first zone configured to operate at a first temperature T1, the first zone comprising a plurality of first fuel particles, each first fuel particle having a first radioactive ceramic core and a seal coating of an oxide, carbide, oxycarbide, or nitride of silicon;
a second zone configured to operate at a second temperature T2, where T2>T1, the second zone comprising a plurality of second fuel particles, each second fuel particle comprising a second radioactive ceramic core and a seal coating of an oxide, carbide, oxycarbide, or nitride of zirconium; and
a third zone configured to operate at a third temperature T3, where T3>T2, the third zone comprising a plurality of third fuel particles, each third fuel particle comprising a third radioactive ceramic core and a seal coating of an oxide, carbide, oxycarbide, or nitride of tungsten. The first fuel particles may have a seal coating of silicon carbide; the second fuel particles may have a seal coating of zirconium carbide; and the third fuel particles may have a seal coating of tungsten carbide. The various seal coatings may be selected so that:
the first fuel particles operate at a T1 between 750° C. and 1200° C.;
the second fuel particles operate at a T2 between 1200° C. and 2000° C.; and
the third fuel particles operate at a T3 between 2000° C. and 2800° C.

The nuclear reactor of claim 1, further comprising:
a plurality of first fuel elements within the first zone, each first fuel element comprising a plurality of the first fuel particles distributed within a first matrix material, wherein the first matrix material is stable at T1; and
a plurality of second fuel elements within the second zone, each second fuel element comprising a plurality of the second fuel particles distributed within a second matrix material, wherein the second matrix material is stable at T2.

Various embodiments disclosed herein relate to a nuclear reactor with an axially stratified fuel bed including multiple zones, with:
- a first zone configured to operate at a first temperature T1, the first zone comprising a plurality of first fuel elements including a plurality of first fuel particles distributed within a first matrix material, where the first matrix material is stable at T1; and
- a second zone configured to operate at a second temperature T2, where T2>T1, the second zone comprising a plurality of second fuel elements, each second fuel element comprising a plurality of the second fuel particles distributed within a second matrix material, where the second matrix material is stable at T2. The reactor may additionally comprise a third zone configured to operate at a third temperature T3, where T3>T2, the third zone comprising a plurality of third fuel elements, each second fuel element comprising a plurality of third fuel particles distributed within a third matrix material, where the second matrix material is stable at T3.

The first matrix material may be a ceramic, a metal, a ceramic-metal composite material, a composite material composed of at least two ceramics, graphite; or a phenolic resin. The second and/or third matrix material may be graphite, WC, or tungsten.

BRIEF DESCRIPTION OF THE DRAWINGS

In order to better understand various exemplary embodiments, reference is made to the accompanying drawings, wherein.

DETAILED DESCRIPTION

Figure 1:
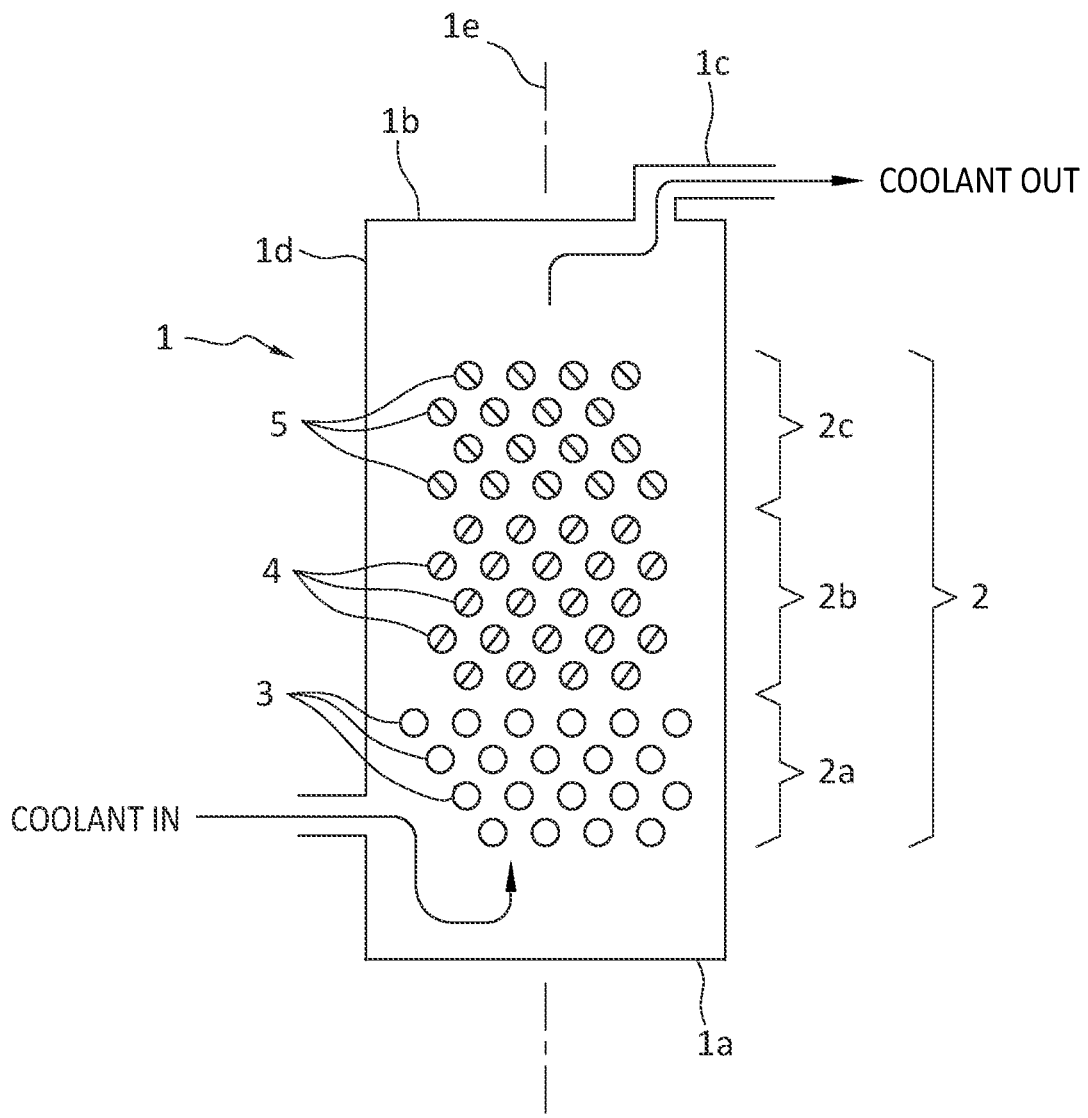
FIG. 1 illustrates a HTGR reactor with an axially stratified fuel bed.

Referring now to the drawings, in which like numerals refer to like components or steps, there are disclosed broad aspects of various exemplary embodiments.

As used herein, a "TRISO particle" is defined as a nuclear fuel particle utilizing successive laminar layers of carbon and a ceramic seal coat. TRISO nuclear fuel particles include a nuclear fuel particle core, which is initially coated with an optional porous low density carbon layer, i.e., a buffer carbon layer, an inner dense pyrolytic carbon (IPyC), a ceramic seal coat, and an optional outer dense pyrolytic carbon (OPyC). The nuclear fuel particle core may be a uranium, thorium, or plutonium ceramic. The ceramic seal coat may be an oxide, carbide, nitride, or oxycarbide of silicon, zirconium, or tungsten, among other high temperature ceramics.

While silicon-based ceramics may be used as seal coatings on nuclear fuel particles, e.g., TRISO type particles, silicon-based ceramic seal coatings are not ideal for high-temperature applications. Silicon oxide is stable at temperatures up to about 800° C., rendering use of silicon oxide suitable only for nuclear reactors operating at low temperatures. Since HGTR reactors typically operate at temperatures up to 900° C., nuclear fuel particles with silicon oxide seal coatings may not be suitable. Silicon carbide and silicon carbonitride are stable at temperatures of about 1400° C. to 1500° C., and are therefore more suitable for HGTR reactors. Silicoboron carbonitride (SiBCN) ceramics are stable at temperatures of up to 1800° C., and may also be used in HGTR reactors. However, reactors used for nuclear thermal propulsion (NTP) technology operate at temperatures up to 2700° C. At these temperatures, silicon-based ceramic seal coatings are unsuitable, as they are not thermally stable. For example, silicon carbide dissociates at about 2450° C.

For superior thermal stability, a variety of carbides, borides, nitrides, and oxycarbides have acceptable thermal properties, include melting points approaching or exceeding 3000° C. Suitable borides include borides of tantalum, titanium, hafnium, and zirconium, which each have melting points exceeding 3000° C. Carbides of tantalum, titanium, hafnium, zirconium and tungsten, or nitrides of titanium, hafnium, and zirconium may also be used. In some embodiments, ceramic alloys, such as titanium hafnium carbide, may be used as high temperature seal coatings.

The current disclosure describes a graded approach to a fuel element bed in an HTGR style reactor which allows operation at higher temperatures that can be achieved with a homogenous bed. This allows HTGR reactors with graded beds to operate at higher efficiencies, and also provides reactors for applications such as nuclear thermal propulsion. Nuclear thermal propulsion requires temperatures surpassing 2000° C.

The graded fuel element bed utilizes a mixture of traditional TRISO particles as well as novel TRISO particles utilizing altered layer orders and carbide materials, such as zirconium carbide (ZrC) and tungsten carbide (WC). Due to the improved mechanical properties of these materials, such as density, these materials can be applied as a seal coat. A TRISO like particle includes a seal coat with a thin layer of dense pyrocarbon and a subsequent thin layer of ceramic material, such as SiC, ZrC, or WC, applied directly to a uranium based fuel particle, or applied to a uranium based fuel particle through an intervening buffer carbon layer. These seal-coated nuclear fuel particles can then be used as is or have additional TRISO layers, such as an outer layer of dense pyrocarbon, applied on top of the seal coat, prior to mixing the TRISO particles with a matrix material, and molding the resulting mixture into nuclear fuel pebbles or compacts. ZrC or WC materials are not typically utilized for traditional HTGR applications due to prohibitive costs for production and worsened irradiation properties, compared to SiC.

Nuclear thermal propulsion (NTP) technology requires gas temperatures exceeding 2700° C. This is a challenge for traditional homogenous fuel bed designs as the primary pressure and containment layer, silicon carbide, is not rated for these extreme temperatures. However, for NTP designs, the highest temperatures are seen at the exhausting area and the lowest temperatures are seen where the gas to be heated is introduced.

The present disclosure describes a three-layer graded fuel bed which utilizes traditional TRISO materials with SiC-based seal coats at the bottom of the fuel bed, where gas is introduced and fuel temperatures are the coolest. As traditional silicon carbide based TRISO layers are also ideal for irradiation properties, this allows the fuel bed to react and produce heat at ideal irradiation conditions.

At the exhaust area of the fuel element bed, operating temperatures can exceed 2700° C. TRISO materials with high temperature ceramic-based seal coats are used at the top of the fuel bed. In various embodiments, the high temperature ceramic-based seal coats may be made of $HfB_2$, $ZrB_2$, $TiB_2$, $TaB_2$, TiC, TaC, WC, HfN, ZrN, TiN, or $Ta_4HfC_5$. In various embodiments, TRISO materials with tungsten carbide-based seal coats are used at the top of the fuel bed. Tungsten carbide has significantly improved mechanical properties and thermal resistance, relative to SiC. However, tungsten carbide has worsened irradiation reactivity, relative to SiC. However, as TRISO materials with WC-based seal coats are utilized at the exhaust, where reactivity is less relevant, they do not impact the operation of the reactor.

At the intermediate point of the bed, where temperatures begin to approach the operating limits of silicon carbide based TRISO layers, e.g., about 1400° C. to 1500° C., nuclear fuel elements that utilize TRISO materials with high temperature ceramic-based seal coats are used. Suitable high temperature ceramic-based seal coats in the intermediate portion of the bed may be made of $HfB_2$, $ZrB_2$, $TiB_2$, $TaB_2$, HfC, ZrC, TiC, TaC, HfN, ZrN, TiN, or $Ta_4HfC_5$. Depending on the temperature at the intermediate portion of the bed, certain silicon-based ceramics may also be used as a seal coat on a nuclear fuel particle. For example, if the intermediate portion of the reactor operates at a temperature of 1400° C. to 1800° C., silicoboron carbonitride (SiBCN) may be used as a seal coating. In various embodiments, zirconium carbide is used as a seal coating in TRISO particles at the intermediate point of the bed This zirconium carbide exhibits similar irradiation properties as silicon carbide but is resistant to higher temperatures. As temperatures approach the operating limits of zirconium carbide, the TRISO materials with ZrC-based seal coats are replaced with TRISO materials with WC-based seal coats.

In various embodiments, the axially stratified fuel bed includes:
- a plurality of first fuel particles with a first ceramic seal coating of an oxide, carbide, oxycarbide, or nitride of silicon;
- a plurality of second fuel particles with a second ceramic seal coating of a first high temperature ceramic-based seal coat of $HfB_2$, $ZrB_2$, $TiB_2$, $TaB_2$, ZrC, HfC, TiC, HfN, ZrN, TiN, or SiBCN; and
- a plurality of third fuel particles with a third ceramic seal coating of a second high temperature ceramic-based seal coat selected from the group consisting of WC, TaC, HfC, or $Ta_4HfC_5$. Due to the extreme temperatures at the exhaust portion at the top of the fuel bed, tungsten carbide and the high-melting carbides of tantalum and/or hafnium (melting point>4000° C.) are desirable.

In various embodiments, the second fuel particles at the intermediate portion of the fuel bed may be made from ceramic alloy coatings. A high temperature boride ceramic, for example, may be co-deposited with from 5% to 30% by weight of SiC. The borides $HfB_2$, $ZrB_2$, and $TiB_2$ may be co-deposited with SiC. While this reduces the temperature at which the resulting alloy may be used, the alloy is still useful at temperatures prevailing at an intermediate portion of the stratified bed, which may be between 1200° C. and 2000° C. For example, $ZrB_2$ is a high temperature ceramic with a melting point exceeding 3000° C. An alloy of $ZrB_2$ containing 23 wt. % SiC ($ZrB_2$—SiC alloy) has a melting point of 2270° C.

Accordingly, in various embodiments, the axially stratified fuel bed may include:
- a plurality of first fuel particles with a first ceramic seal coating of SiC;
- a plurality of second fuel particles with a second ceramic seal coating of a ceramic alloy of $ZrB_2$—SiC, $HfB_2$—SiC, $TaB_2$—SiC, or $TiB_2$—SiC; and
- a plurality of third fuel particles with a third ceramic seal coating of $HfB_2$, $ZrB_2$, $TiB_2$, or $TaB_2$.

The present disclosure also describes a two-layer graded fuel bed which utilizes traditional TRISO materials with SiC-based seal coats at the bottom of the fuel bed, where gas is introduced and fuel temperatures are the coolest. At the exhaust area of the fuel element bed, operating temperatures may reach 2000 to 2700° C. In various embodiments, high temperature ceramic-based seal coats in the exhaust area of the bed may be made of $HfB_2$, $ZrB_2$, $TiB_2$, $TaB_2$, HfC, ZrC, TiC, TaC, WC, HfN, ZrN, TiN, or $Ta_4HfC_5$. For example, TRISO materials with ZrC- or WC-based seal coats may be used at the top of the fuel bed. If the temperature at the exhaust area is 2000° C. or less, either TRISO materials with ZrC-based seal coats or TRISO materials with WC-based seal coats may be used at the exhaust area. If the temperature at the exhaust area exceeds 2000° C., TRISO materials with WC-based seal coats should be used at the exhaust area.

In general, ceramic seal coatings may be deposited on nuclear fuel particles by chemical vapor deposition from a suitable precursor, using techniques known in the art. Ceramic seal coatings may be deposited on nuclear fuel particles directly, or through an intervening pyrolytic carbon layer. An outer pyrolytic carbon layer is optionally deposited on the ceramic seal coating.

As described, the graded fuel element bed can operate at significantly higher temperatures than traditional HTGR style homogenous fuel beds. This may increase the efficiency of reactor design for energy generation and allow for specialized applications such as NTP designs with extreme temperatures.

FIG. 1 shows an HTGR reactor 1 with a graded fuel element bed 2. The reactor includes a shell 1d, with a bottom 1a, a top 1b, and an axis 1e. A coolant inlet 1f is positioned at or near the bottom 1a of the reactor shell 1d, and a coolant outlet 1c is positioned at or near the top 1c of the reactor shell 1d. An gas coolant flows into the coolant inlet 1f and out the coolant outlet 1c. The coolant flows through a plurality of nuclear fuel particles in the graded fuel element bed 2. The coolant gas may be an inert gas, nitrogen, argon, helium, hydrogen, water, ammonia, oxygen, or carbon dioxide.

As shown in FIG. 1, the graded fuel element bed 2 contains multiple zones, including from two to four zones. The graded fuel element bed 2 may contain three zones, including zones 2a, 2b, and 2c shown in FIG. 1. The graded fuel element bed 2 may contain two zones, including zones 2a and 2c shown in FIG. 1. The first zone 2a is positioned at the bottom of the reactor, near gas inlet 1f. Zone 2a contains nuclear fuel particles 3. Nuclear fuel particles 3 are configured to operate at a first temperature T1, where each nuclear fuel particle 3 includes a first radioactive ceramic core and a first seal coating. The first seal coating may be a first ceramic seal coating which is stable at T1. In various embodiments, the first ceramic seal coating is an oxide, carbide, nitride, or oxynitride of silicon or zirconium. The first ceramic seal coating may be silicon carbide, silicon nitride, zirconium carbide, or zirconium nitride.

In various embodiments, the graded fuel element bed 2 contains two zones, including zones 2a and 2c shown in FIG. 1. The uppermost zone 2c is positioned at the top of the reactor, near gas outlet 1c. Zone 2c contains nuclear fuel particles 5. Nuclear fuel particles 5 are configured to operate at a third temperature T3, where each nuclear fuel particle 5 includes a third radioactive ceramic core and a third seal coating. The third seal coating may be a third ceramic seal coating which is stable at T3, where T3>T1. In various embodiments, the third ceramic seal coating is an oxide, carbide, nitride, or oxynitride of zirconium or tungsten. The third ceramic seal coating may be zirconium carbide, zirconium nitride, tungsten carbide, or tungsten oxynitride. The first radioactive ceramic core and the third radioactive ceramic core are each an oxide, carbide, oxycarbide, or nitride of uranium, thorium, or plutonium.

In various embodiments, the graded fuel element bed 2 contains two zones 2a and 2c. Nuclear fuel particles 3 in zone 2a include a first radioactive ceramic core and a ceramic seal coating including silicon carbide. Nuclear fuel particles 5 in zone 2c include a third radioactive ceramic core and a ceramic seal coating including zirconium carbide. Nuclear fuel particles 3 are configured to operate at a temperature T1 between 750° C. and 1200° C. Nuclear fuel particles 5 are configured to operate at a temperature T2 between 1200° C. and 2000° C. The silicon carbide coating in nuclear fuel particles 3 is not stable at temperatures exceeding 1600° C.

In various embodiments, nuclear fuel particles 3 in zone 2a include a first radioactive ceramic core and a ceramic seal coating including silicon carbide. Nuclear fuel particles 5 in zone 2c include a third radioactive ceramic core and a ceramic seal coating including tungsten carbide. Nuclear fuel particles 3 are configured to operate at a temperature T1 between 750° C. and 1600° C., at which point the silicon carbide coating becomes thermally unstable. Nuclear fuel particles 5 are configured to operate at a temperature T2 between 1600° C. and 2800° C.

In various embodiments, nuclear fuel particles 3 in zone 2a include a first radioactive ceramic core and a ceramic seal coating including zirconium carbide. Nuclear fuel particles 5 in zone 2c include a third radioactive ceramic core and a ceramic seal coating including tungsten carbide. Nuclear fuel particles 3 are configured to operate at a temperature T1 between 750° C. and 2000° C. Nuclear fuel particles 5 are configured to operate at a temperature T2 between 2000° C. and 2800° C.

The graded fuel element bed 2 may contain three zones, including zones 2a, 2b, and 2c shown in FIG. 1. Zone 2a contains nuclear fuel particles 3 configured to operate at a first temperature T1. Zone 2b contains nuclear fuel particles 4 configured to operate at a second temperature T2, where T2>T1. Zone 2c contains nuclear fuel particles 5 configured to operate at a third temperature T3, where T3>T2. Nuclear fuel particles 3 have a first ceramic seal coating with greater thermal stability at T1 than at T2. Nuclear fuel particles 4 have a second ceramic seal coating with greater thermal stability at T2 than the first ceramic seal coating, and greater thermal stability at $T_2$ than at $T_3$. Nuclear fuel particles 5 have a third ceramic seal coating with greater thermal stability at $T_3$ than the second ceramic seal coating.

Figure 2A:
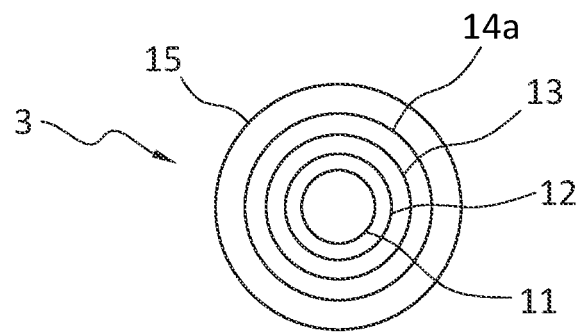
FIGS. 2A to 2C show TRISO type fuel particles suitable for use in the reactor of FIG. 1.

FIG. 2A shows a particle suitable for use as a nuclear fuel particle 3 in the first zone 2a of the reactor of FIG. 1, where the first zone operates at a temperature of up to 1200° C., or up to 1500° C. Particle 3 as shown in FIG. 2A includes a radioactive kernel or core 11, which may be an oxide, carbide, oxycarbide, or nitride of uranium, thorium, or plutonium. Core 11 may be a uranium oxide based nuclear fuel particle core, e.g., $UO_3$ or $U_3O_8$. Core 11 is then coated with an optional buffer carbon layer 12, an inner dense pyrolytic carbon (IPyC) layer 13, a ceramic seal coat 14a, and an optional outer dense pyrolytic carbon (OPyC) 15. In various embodiments, the nuclear fuel particle 3 is a TRISO particle containing each of layers 12 to 15, where layer 14a is silicon carbide. In various embodiments, the nuclear fuel particle 3 is a TRISO-type particle containing at least layers 13 and 14a, where layer 14a is an oxide, carbide, nitride, or oxynitride of silicon.

Figure 2B:
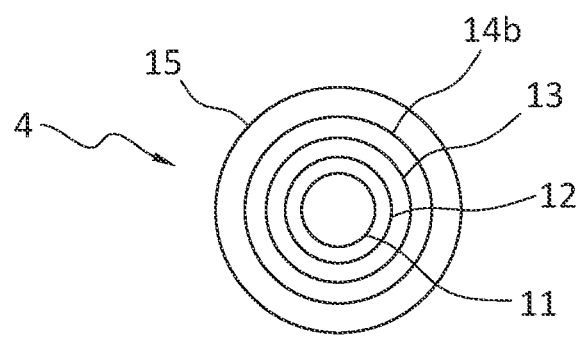

FIG. 2B shows a particle suitable for use as a nuclear fuel particle 4 in the middle zone 2b of the reactor of FIG. 1, where the second zone operates at a temperature of up to 1600° C., or up to 2000° C. Particle 4 as shown in FIG. 2B includes a radioactive kernel or core 11, similar to that shown in FIG. 2A. Core 11 is then coated with an optional buffer carbon layer 12, an inner dense pyrolytic carbon (IPyC) layer 13, a ceramic seal coat 14b, and an optional outer dense pyrolytic carbon (OPyC) 15. In various embodiments, the nuclear fuel particle 5 is a TRISO-type particle containing at least layers 13 and 14b, where layer 14b is an oxide, carbide, nitride, or oxynitride of zirconium. In various embodiments where the first zone operates at a temperature of up to 1200° C., the second zone operates at a temperature of up to 1600° C., and layer 14b may be a layer of zirconium carbide, hafnium boride, titanium boride, or tantalum boride, or a layer of a boride selected from hafnium boride, titanium boride, tantalum boride, and zirconium boride. In various embodiments where the second zone operates at a temperature of up to 2000° C., layer 14b may be a layer of zirconium carbide, or a layer of a boride selected from hafnium boride, titanium boride, tantalum boride, and zirconium boride.

Figure 2C:
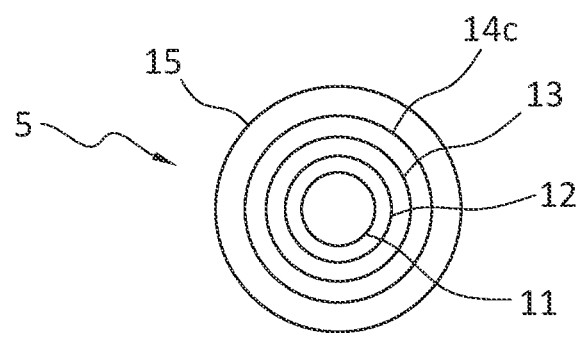

FIG. 2C shows a particle suitable for use as a nuclear fuel particle 5 in the upper zone 2c of the reactor of FIG. 1, where the third zone operates at a temperature of up to 2000° C., or up to 2800° C. Particle 5 as shown in FIG. 2C includes a radioactive kernel or core 11. Core 11 is then coated with an optional buffer carbon layer 12, an inner dense pyrolytic carbon (IPyC) layer 13, a ceramic seal coat 14c, and an optional outer dense pyrolytic carbon (OPyC) 15. In various embodiments, the nuclear fuel particle 5 is a TRISO-type particle containing at least layers 13 and 14c, where layer 14c is an oxide, carbide, nitride, or oxynitride of tungsten. In various embodiments where the second zone operates at a temperature of up to 1600° C., the second zone operates at a temperature of up to 2000° C., and layer 14c may be a layer of zirconium carbide or tungsten carbide, or a layer of a boride selected from hafnium boride, titanium boride, tantalum boride, and zirconium boride. In various embodiments where the second zone operates at a temperature of up to 2800° C., layer 14b is a layer of tungsten carbide.

As discussed above, the graded fuel element bed 2 may contain two zones, including zones 2a and 2c shown in FIG. 1. The material used for ceramic seal coat on nuclear fuel particles 3 and 5 is selected based on operating temperatures in the respective zones. If zone 2a reaches a temperature of up to 1200° C. and zone 2c reaches a temperature of up to 2000° C., zone 2a may contain nuclear fuel particles 3 where a silicon-based ceramic layer is used as layer 14a and zone 2c may contain nuclear fuel particles 5 where a zirconium- or tungsten-based ceramic layer is used as layer 14c. If zone 2a reaches a temperature of up to 1600° C. and zone 2c reaches a temperature of up to 2800° C., zone 2a may contain nuclear fuel particles 3 with a zirconium- or silicon-based ceramic layer 14a and zone 2c may contain nuclear fuel particles 5 with a tungsten-based ceramic layer 14c. If zone 2a reaches a temperature of up to 2000° C. and zone 2c reaches a temperature of up to 2800° C., zone 2a may contain nuclear fuel particles 3 with a zirconium-based ceramic layer 14a and zone 2c may contain nuclear fuel particles 5 with a tungsten-based ceramic layer 14c. Tungsten-based ceramics have greater thermal stability than zirconium-based ceramics, which in turn have greater thermal stability than silicon-based ceramics. However, precursors for zirconium- and tungsten-based ceramics are more expensive than precursors for silicon-based ceramics. Accordingly, a more economical silicon-based seal coating 14a may be used in particles 3 in the low-temperature zone 2a, while zirconium- or tungsten-based ceramic seal coatings may be used in the high-temperature zone 2c. In some embodiments where low-temperature zone 2a operates at a temperature exceeding 1200° C., or exceeding 1600° C., a zirconium-based seal coating 14a may be used in particles 3 in the low-temperature zone 2a, while tungsten-based ceramic seal coatings may be used in the high-temperature zone 2c.

Figure 3A:
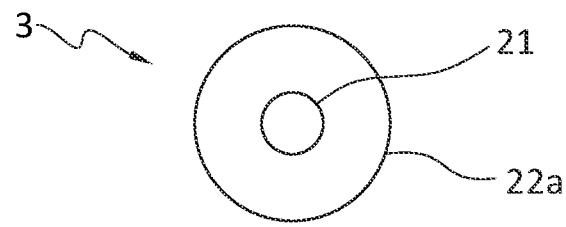
FIGS. 3A to 3C show seal coated fuel particles suitable for use in the reactor of FIG. 1.
Figure 3B:
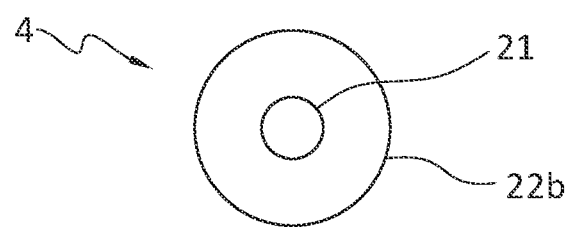
Figure 3C:
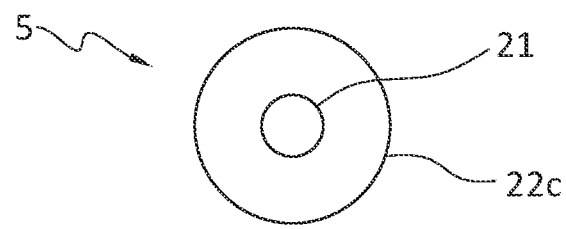

FIGS. 3A to 3C show alternate embodiments of particles suitable for use as nuclear fuel particles in the reactor of FIG. 1. Particle 3 as shown in FIG. 3A may be used in the lower zone 2a of the reactor, and includes a radioactive kernel or core 21, which may be an oxide, carbide, oxycarbide, or nitride of uranium, thorium, or plutonium. Core 21 is then coated with a ceramic seal coat 22a. In various embodiments, ceramic seal coat 22a is an oxide, carbide, nitride, or oxynitride of silicon, and is configured to operate at a temperature of up to 1200° C. FIG. 3B shows an alternate embodiment of a particle suitable for use as a nuclear fuel particle 4 in the middle zone 2b of the reactor of FIG. 1. Particle 4 as shown in FIG. 3B includes a radioactive kernel or core 21 and a ceramic seal coat 22b, where layer 22b is an oxide, carbide, nitride, or oxynitride of zirconium, and is configured to operate at a temperature of up to 2000° C. FIG. 3C shows an alternate embodiment of a particle suitable for use as a nuclear fuel particle 5 in the upper zone 2c of the reactor of FIG. 1. Particle 5 as shown in FIG. 3C includes a radioactive kernel or core 21, and a ceramic seal coat 22c, where layer 22c is an oxide, carbide, nitride, or oxynitride of tungsten, and is configured to operate at a temperature of up to 2800° C.

In various embodiments, a first ceramic seal coating, e.g., layer 14a of FIG. 2A, has a first neutron absorption cross section; the second ceramic seal coating, e.g., layer 14b of FIG. 2B, has a second neutron absorption cross section; and the third ceramic seal coating, e.g., layer 14c of FIG. 2C, has a third neutron absorption cross section. The third neutron absorption cross section may be lower than the first and/or the second neutron absorption cross sections. Silicon carbide has good thermal stability at temperatures prevalent in zone 2a of the reactor, and also has good irradiatiation properties, e.g., a high neutron absorption cross section, allowing nuclear particles 3 with SiC layers 14a in zone 2a of the fuel bed 2 to react and produce heat. Zirconium carbide has good thermal stability at temperatures prevalent in zone 2b of the reactor, which exceed those prevalent in zone 2a, and also has acceptable irradiatiation properties, allowing nuclear particles 4 with ZrC layers 14b to be used in zone 2a. In various embodiments, temperatures in the third zone 2c may reach 2500° C. to 2500° C. Under these extreme conditions, most ceramic coatings are not thermally stable. Accordingly, nuclear particles 5 with tungsten carbide layers 14c are used in zone 2c. The tungsten carbide layers 14c have good thermal stability at temperatures prevalent in zone 2c of the reactor. While WC has poorer irradiatiation properties, e.g., a lower neutron absorption cross section, than ZrC or SiC, irradiation properties are less critical than thermal stability in the high temperature zone 2c, so use of a WC layer 14c is acceptable. The same considerations also apply to ceramic seal coats 22a-22c in FIGS. 3A to 3C.

Returning to FIG. 1, a combination of single-coated nuclear fuel particles of FIGS. 3A to 3C and multi-coated nuclear fuel particles of FIGS. 2A to 2C may be used in the reactor in different zones in the reactor. In the lower zone 2a, particles 3 with a radioactive kernel or core 21 and a single outer silicon carbide layer 22a may be used, where zone 2a operates at a temperature of up to 1200° C. In the middle zone 2b, TRISO particles 3 of FIG. 2A, which contain a radioactive kernel 11, a silicon carbide layer 14a, and an outer pyrolytic carbon layer 15 may be used, where zone 2b operates at a temperature of up to 1600° C. The exposed silicon carbide layer 22a on particles in the lower zone 2a is thermally stable up to 1200° C.; above this point, the silicon carbide surface may be subject to oxidation if an oxygen source contaminates the coolant gas. The silicon carbide layer 14a on particles in the middle zone 2b is protected from exposure to oxidants by the dense pyrolytic carbon layer 15, and is less subject to oxidation. Nuclear fuel particles 5 of FIG. 2C or FIG. 3C with zirconium- or tungsten-based ceramic seal coatings 14c or 22c may be used in the upper zone 2c of the reactor.

In an alternate embodiment, a combination of nuclear fuel particles lacking a seal coat and nuclear fuel particles with a ceramic seal coat may be used in the reactor in different zones in the reactor of FIG. 1. In the lower zone 2a, particles 3 with a radioactive kernel or core 12, a porous carbon layer 12, and a pyrolytic carbon layer 13 may be used, where particles 3 in zone 2a are similar to the particles of FIG. 2A except that they lack outer layers 14a and 15. Zone 2a operates at a temperature of up to 1200° C. In the middle zone 2b, TRISO particles 3 of FIG. 2A, which contain a radioactive kernel 11, inner carbon layers 12 and 13, a silicon carbide or zirconium carbide layer 14a, and an outer pyrolytic carbon layer 15 may be used, where zone 2b operates at a temperature of up to 1600° C. The silicon carbide layer 14a on particles in the middle zone 2b is protected from exposure to oxidants by the dense pyrolytic carbon layer 15. Nuclear fuel particles 5 of FIG. 2C or FIG. 3C with zirconium- or tungsten-based ceramic seal coatings 14c or 22c may be used in the upper zone 2c of the reactor. Generally, zirconium-based ceramic seal coatings are not used in both zone 2b and zone 2c.

Figure 4:
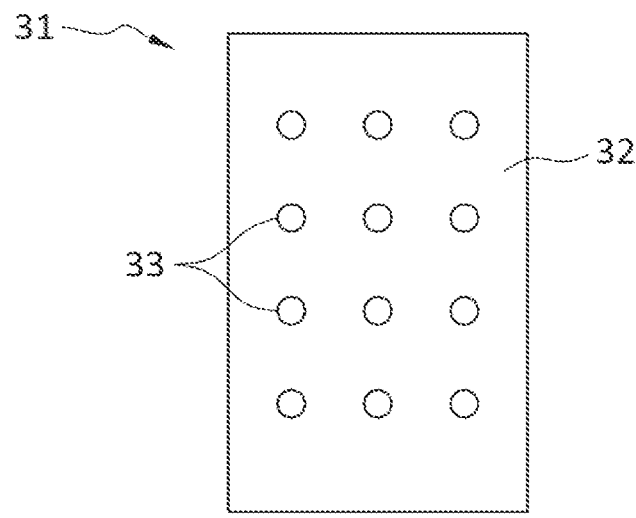
FIG. 4 shows a nuclear fuel element.

While FIG. 1 shows a graded fuel element bed 2 with multiple zones 2a-2c of nuclear fuel particles, various embodiments disclosed herein include graded fuel element beds containing fuel elements containing nuclear fuel particles dispersed within a matrix material. FIG. 4 shows a nuclear fuel compact 31 with nuclear fuel particles 33 dispersed in a matrix material 32. Nuclear fuel particles 33 may be any of particles 3, 4, and 5 shown in FIGS. 2A to 2C, where the ceramic layer 14a, 14b, or 14c is selected based on the desired operating temperature of the compact. Alternatively, nuclear fuel particles 33 may be any of the particles 3, 4, and 5 shown in FIGS. 3A to 3C, where the ceramic layer 22a, 22b, or 22c is selected based on the desired operating temperature. If the desired operating temperature of nuclear fuel compact 31 is below 1200° C., the matrix material 32 may be a ceramic material; a metal; a ceramic-metal composite material, e.g., titanium carbide/nickel-cobalt cermet, tungsten carbide/cobalt cermet, etc.; a composite material composed of at least two ceramics; graphite; or a phenolic resin. If the desired operating temperature of nuclear fuel compact 31 exceeds 1200° C., the matrix material 32 may be a heat stable material such as graphite, WC, or tungsten.

Nuclear fuel compacts 31 may be cuboid or cylindrical. In various embodiments, nuclear fuel compacts 31 may be generally spherical pebbles with nuclear fuel particles 33 evenly dispersed therein.

Figure 5:
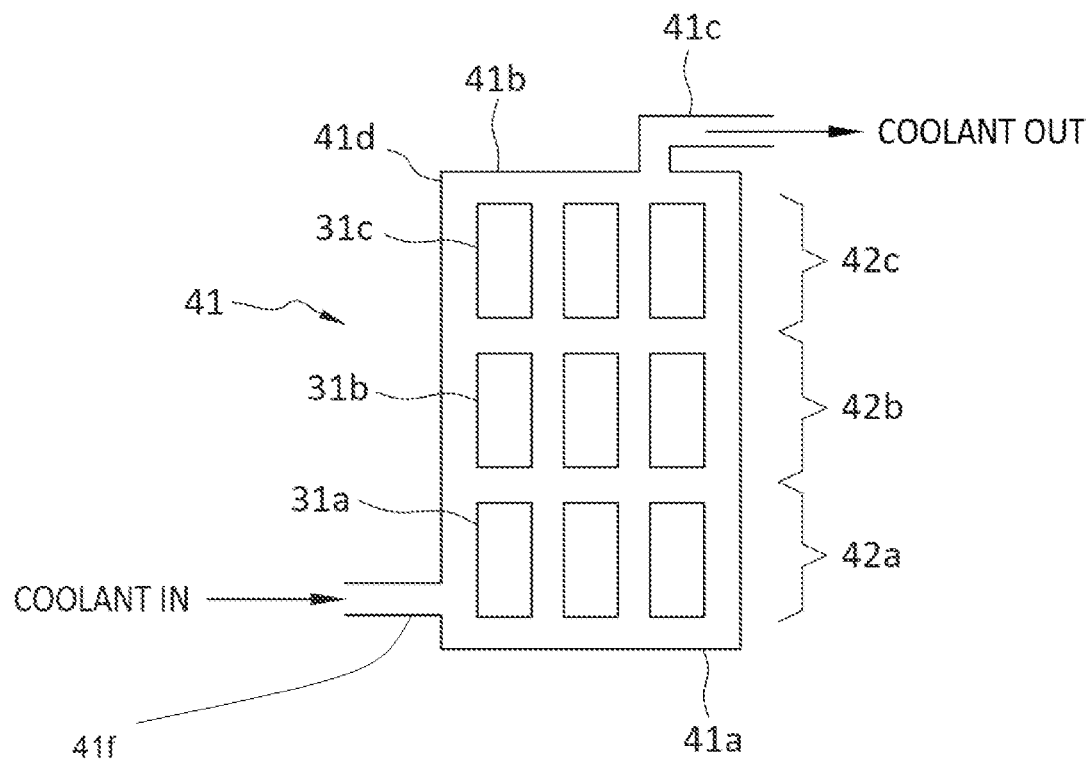
FIG. 5 illustrates a HTGR reactor with an axially stratified fuel bed containing nuclear fuel elements.

FIG. 5 shows an HTGR reactor 1 with a graded fuel element bed 2, similar to that of FIG. 1. The reactor includes a shell 41d. A coolant inlet 41f is positioned at or near the bottom 41a of the reactor shell 41d and a coolant outlet 41c is positioned at or near the top 41b of the reactor shell 1d. As shown in FIG. 5, the graded fuel element bed 42 contains multiple zones, including zones 42a, 42b, and 42c. The first zone 42a is positioned at the bottom of the reactor, near gas inlet 41f. The third zone 42c is positioned at the top of the reactor, near gas outlet 41c.

Zone 42a contains nuclear compacts 31a, where compacts 31a are similar to the compacts 31 of FIG. 4. Compacts 31a contain nuclear fuel particles 33 dispersed in a matrix 32, where nuclear fuel particles 33 may be particles 3 of FIG. 2a or FIG. 3a, where particles 3 contain a ceramic seal coating 14a or 22a of silicon carbide. Zone 42a containing nuclear compacts 31a is configured to operate at temperatures of up to 1200° C., or up to 1600° C.

Zone 42b contains nuclear compacts 31b. Compacts 31b contain nuclear fuel particles 33 dispersed in a matrix 32, where nuclear fuel particles 33 may be particles 4 of FIG. 2B or FIG. 3B, where particles 3 contain a ceramic seal coating 14b or 22b of zirconium carbide. Zone 42b containing nuclear compacts 31b is configured to operate at temperatures of up to 2000° C.

Zone 42c contains nuclear compacts 31c. Compacts 31c contain nuclear fuel particles 33 dispersed in a matrix 32, where nuclear fuel particles 33 may be particles 5 of FIG. 2C or FIG. 3C, where particles 3 contain a ceramic seal coating 14c or 22c of tungsten carbide. Zone 42c containing nuclear compacts 31c is configured to operate at temperatures of up to 2800° C.

The compacts 31a, 31b, and 31c of zones 42a, 42b, and 42b contain sufficient mass to avoid fluidization by the coolant gas.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A nuclear reactor with an axially stratified fuel bed, comprising:
a reactor shell having a base, a top having an exhaust outlet, and an axis;
the axially stratified fuel bed comprising:
a first zone configured to operate at a first temperature $T_1$, the first zone comprising a plurality of first fuel particles, each first fuel particle comprising a first radioactive ceramic core and a first coating, wherein the first coating is a first ceramic seal coating; and
a second zone configured to operate at a second temperature $T_2$, where $T_2>T_1$, the second zone comprising a plurality of second fuel particles, each second fuel particle comprising a second radioactive ceramic core and a second ceramic seal coating;
a coolant fluid flow path configured to carry a coolant fluid from the base of the reactor to the exhaust outlet, wherein the coolant fluid flow path sequentially passes through the first zone and the second zone;
wherein:
the first ceramic seal coating has greater stability at $T_1$ than at $T_2$, and
the second ceramic seal coating has greater stability at $T_2$ than the first ceramic seal coating.

2. The nuclear reactor of claim 1, wherein the coolant fluid is nitrogen, argon, helium, hydrogen, water, ammonia, oxygen, or carbon dioxide.

3. The nuclear reactor of claim 1, wherein:
the first ceramic seal coating has a first neutron absorption cross section; and
the second ceramic seal coating has a second neutron absorption cross section;
wherein the second neutron absorption cross section is higher than the first neutron absorption cross section.

4. The nuclear reactor of claim 1, wherein:
the first radioactive ceramic core and the second radioactive ceramic core are each an oxide, carbide, oxycarbide, or nitride of uranium, thorium, or plutonium.

5. The nuclear reactor of claim 1, wherein:
the first radioactive ceramic core is selected from the group consisting of an oxide, carbide, oxycarbide, or nitride of uranium, thorium, or plutonium; and
the second radioactive ceramic core is a uranium oxide.

6. The nuclear reactor of claim 1, wherein:
the first ceramic seal coating is selected from the group consisting of an oxide, carbide, boride, oxycarbide, or nitride of silicon; and
the second ceramic seal coating is a high temperature ceramic-based seal coat selected from the group consisting of $HfB_2$, $ZrB_2$, $TiB_2$, $TaB_2$, $ZrC$, $HfC$, $TiC$, $TaC$, $WC$, $HfN$, $ZrN$, $TiN$, $SiBCN$, and $Ta_4HfC_5$.

7. The nuclear reactor of claim 1, wherein:
the first ceramic seal coating is an oxide, carbide, boride, oxycarbide, or nitride of silicon or zirconium; and
the second ceramic seal coating is an oxide, boride, carbide, oxycarbide, or nitride of zirconium or tungsten;
wherein the first ceramic seal coating and the second ceramic seal coating do not both contain zirconium.

8. The nuclear reactor of claim 7, wherein:
the first ceramic seal coating is silicon carbide; and
the second ceramic seal coating is zirconium carbide;
wherein $T_1$ is between 750° C. and 1200° C., and $T_2$ is between 1200° C. and 2000° C.

9. The nuclear reactor of claim 7, wherein:
the first ceramic seal coating is silicon carbide; and
the second ceramic seal coating is tungsten carbide;
wherein $T_1$ is between 750° C. and 1600° C., and $T_2$ is between 1600° C. and 2800° C.

10. The nuclear reactor of claim 7, wherein:
the first ceramic seal coating is zirconium carbide; and
the second ceramic seal coating is tungsten carbide;
wherein $T_1$ is between 750° C. and 2000° C., and $T_2$ is between 2000° C. and 2800° C.

11. The nuclear reactor of claim 1, further comprising:
a third zone configured to operate at a third temperature $T_3$, where $T_3>T_2$, the third zone comprising a plurality of third fuel particles, each third fuel particle comprising a third radioactive ceramic core and a third ceramic seal coating;

wherein:
the second ceramic seal coating has greater stability at $T_2$ than at $T_3$; and
the third ceramic seal coating has greater stability at $T_3$ than the second ceramic seal coating.

12. The nuclear reactor of claim 11, wherein:
the first ceramic seal coating has a first neutron absorption cross section; and
the third ceramic seal coating has a third neutron absorption cross section;
wherein the third neutron absorption cross section is higher than the first neutron absorption cross section.

13. The nuclear reactor of claim 12, wherein:
the first ceramic seal coating is silicon carbide; and
the second ceramic seal coating is zirconium carbide; and
the third ceramic seal coating is tungsten carbide.

14. The nuclear reactor of claim 13, wherein:
$T_1$ is between 750° C. and 1200° C.;
$T_2$ is between 1200° C. and 2000° C.; and
$T_3$ is between 2000° C. and 2800° C.

15. The nuclear reactor of claim 11, wherein:
the first ceramic seal coating is an oxide, carbide, oxycarbide, or nitride of silicon;
the second ceramic seal coating is a first high temperature ceramic-based seal coat selected from the group consisting of $HfB_2$, $ZrB_2$, $TiB_2$, $TaB_2$, ZrC, HfC, TiC, TaC, HfN, ZrN, TiN, SiBCN, and $Ta_4HfC_5$; and
the third ceramic seal coating is a second high temperature ceramic-based seal coat selected from the group consisting of $HfB_2$, $ZrB_2$, $TiB_2$, $TaB_2$, TiC, TaC, WC, HfN, ZrN, TiN, or $Ta_4HfC_5$;
wherein the second and the third ceramic seal coatings are different.

16. The nuclear reactor of claim 11, wherein:
the first ceramic seal coating is an oxide, carbide, oxycarbide, or nitride of silicon;
the second ceramic seal coating is a first high temperature ceramic-based seal coat selected from the group consisting of $HfB_2$, $ZrB_2$, $TiB_2$, $TaB_2$, ZrC, TiC, HfN, ZIN, TiN, SiBCN, and $Ta_4HfC_5$; and
the third ceramic seal coating is a second high temperature ceramic-based seal coat selected from the group consisting of WC, TaC, HfC, and $Ta_1HfC_5$.

17. The nuclear reactor of claim 11, wherein:
the first ceramic seal coating is selected from the group consisting of an oxide, carbide, oxycarbide, or nitride of silicon; and
the second ceramic seal coating is an oxide, carbide, oxycarbide, or nitride of zirconium; and
the third ceramic seal coating is an oxide, carbide, oxycarbide, or nitride of tungsten.

18. The nuclear reactor of claim 11, further comprising:
a plurality of first fuel elements within the first zone, each first fuel element comprising a plurality of the first fuel particles distributed within a first matrix material, wherein the first matrix material is stable at $T_1$;
a plurality of second fuel elements within the second zone, each second fuel element comprising a plurality of the second fuel particles distributed within a second matrix material, wherein the second matrix material is stable at $T_2$; and
a plurality of third fuel elements within the third zone, each third fuel element comprising a plurality of the third fuel particles distributed within a third matrix material, wherein the third matrix material is stable at $T_3$.

19. The nuclear reactor of claim 11, wherein:
each first fuel particle comprises the first radioactive ceramic core, the first ceramic seal coating, and at least one carbon coating;
each second fuel particle comprises the second radioactive ceramic core, the second ceramic seal coating, and at least one carbon coating; and
each third fuel particle comprises the third radioactive ceramic core, the third ceramic seal coating, and at least one carbon coating.

20. The nuclear reactor of claim 1, further comprising:
a plurality of first fuel elements within the first zone, each first fuel element comprising a plurality of the first fuel particles distributed within a first matrix material, wherein the first matrix material is stable at $T_1$; and
a plurality of second fuel elements within the second zone, each second fuel element comprising a plurality of the second fuel particles distributed within a second matrix material, wherein the second matrix material is stable at $T_2$.

21. The nuclear reactor of claim 20, wherein the first matrix material is selected from the group consisting of:
a ceramic;
a metal;
a ceramic-metal composite material;
a composite material composed of at least two ceramics;
graphite; and
a phenolic resin.

22. The nuclear reactor of claim 20, wherein the second matrix material is selected from the group consisting of graphite, WC, and tungsten.

23. The nuclear reactor of claim 1, wherein:
each first fuel particle comprises the first radioactive ceramic core, the first ceramic seal coating, and at least one carbon coating; and
each second fuel particle comprises the second radioactive ceramic core, the second ceramic seal coating, and at least one carbon coating.

* * * * *